United States Patent
Nose et al.

(10) Patent No.: US 10,443,520 B2
(45) Date of Patent: Oct. 15, 2019

(54) CONTROL APPARATUS FOR INTERNAL COMBUSTION ENGINE

(71) Applicant: TOYOTA JIDOSHA KABUSHIKI KAISHA, Toyota-shi (JP)

(72) Inventors: Yuki Nose, Kasugai (JP); Keiichi Myojo, Okazaki (JP); Yoshiyuki Shogenji, Toyota (JP); Eiji Ikuta, Oobu (JP)

(73) Assignee: TOYOTA JIDOSHA KABUSHIKI KAISHA, Toyota-shi (JP)

( * ) Notice: Subject to any disclaimer, the term of this patent is extended or adjusted under 35 U.S.C. 154(b) by 40 days.

(21) Appl. No.: 15/852,148

(22) Filed: Dec. 22, 2017

(65) Prior Publication Data
US 2018/0179972 A1 Jun. 28, 2018

(30) Foreign Application Priority Data
Dec. 27, 2016 (JP) ................................. 2016-252595

(51) Int. Cl.
*F02D 41/02* (2006.01)
*F02D 41/00* (2006.01)
(Continued)

(52) U.S. Cl.
CPC ............. *F02D 41/025* (2013.01); *F01N 9/00* (2013.01); *F02D 41/008* (2013.01);
(Continued)

(58) Field of Classification Search
CPC .... F01N 9/00; F01N 2260/10; F01N 2430/06; F01N 2900/1602; F01N 3/101;
(Continued)

(56) References Cited

U.S. PATENT DOCUMENTS 6,233,923 B1 * 5/2001 Itou ....................... F01N 3/0814
60/277
2015/0300245 A1 * 10/2015 Korenaga ............... F02B 37/18
60/603

FOREIGN PATENT DOCUMENTS

JP  2000-130223 A   5/2000
JP  2006-291825 A   10/2006
(Continued)

*Primary Examiner* — Brandon D Lee
(74) *Attorney, Agent, or Firm* — Oblon, McClelland, Maier & Neustadt, L.L.P.

(57) ABSTRACT

A control apparatus for an internal combustion engine includes an ECU configured to: determine whether a temperature-increasing process is being executed; calculate a target value of a parameter correlated with a difference between a rich air-fuel ratio and a lean air-fuel ratio achieved in the temperature-increasing process, based on an operating state of the internal combustion engine; calculate, as an upper limit, a value of the parameter required to increase the temperature of the catalyst to a predetermined upper limit temperature; determine whether the target value is equal to or lower than the upper limit; adjust the parameter used in the temperature-increasing process to the target value when the target value is determined to be equal to or lower than the upper limit; and adjust the parameter used in the temperature-increasing process to the upper limit when the target value is determined to be higher than the upper limit.

6 Claims, 6 Drawing Sheets

(51) Int. Cl.
*F02D 41/14* (2006.01)
*F01N 9/00* (2006.01)
*F01N 3/10* (2006.01)

(52) U.S. Cl.
CPC ..... *F02D 41/1456* (2013.01); *F02D 41/1475* (2013.01); *F01N 3/101* (2013.01); *F01N 2260/10* (2013.01); *F01N 2430/06* (2013.01); *F01N 2900/1602* (2013.01); *Y02T 10/26* (2013.01)

(58) Field of Classification Search
CPC .. F02D 41/008; F02D 41/025; F02D 41/1456; F02D 41/1475; Y02T 10/26
See application file for complete search history.

(56) References Cited

FOREIGN PATENT DOCUMENTS

| | | |
|---|---|---|
| JP | 2009-174443 A | 8/2009 |
| JP | 2012-57492 | 3/2012 |
| WO | WO 2006/109755 A1 | 10/2006 |

\* cited by examiner

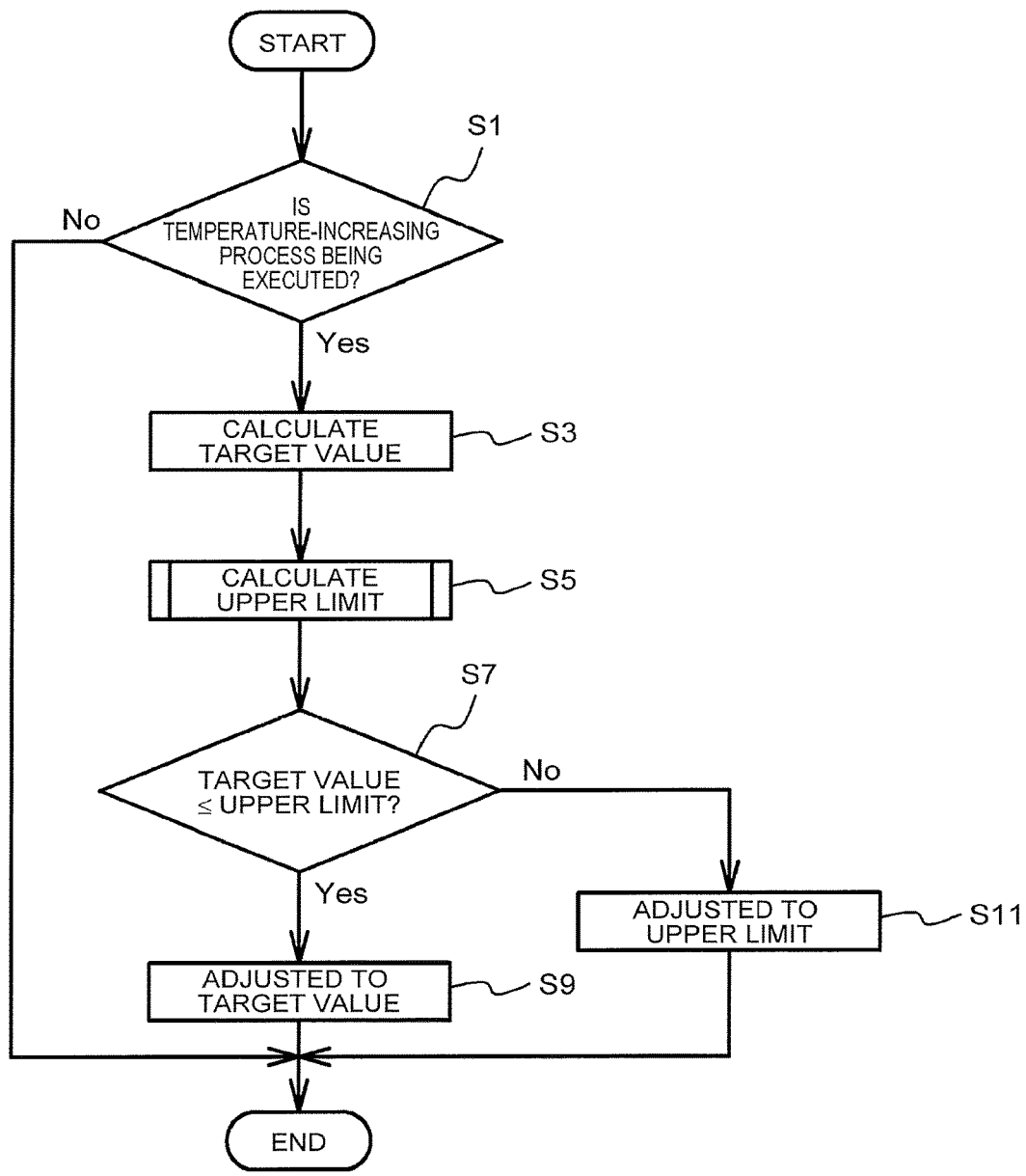

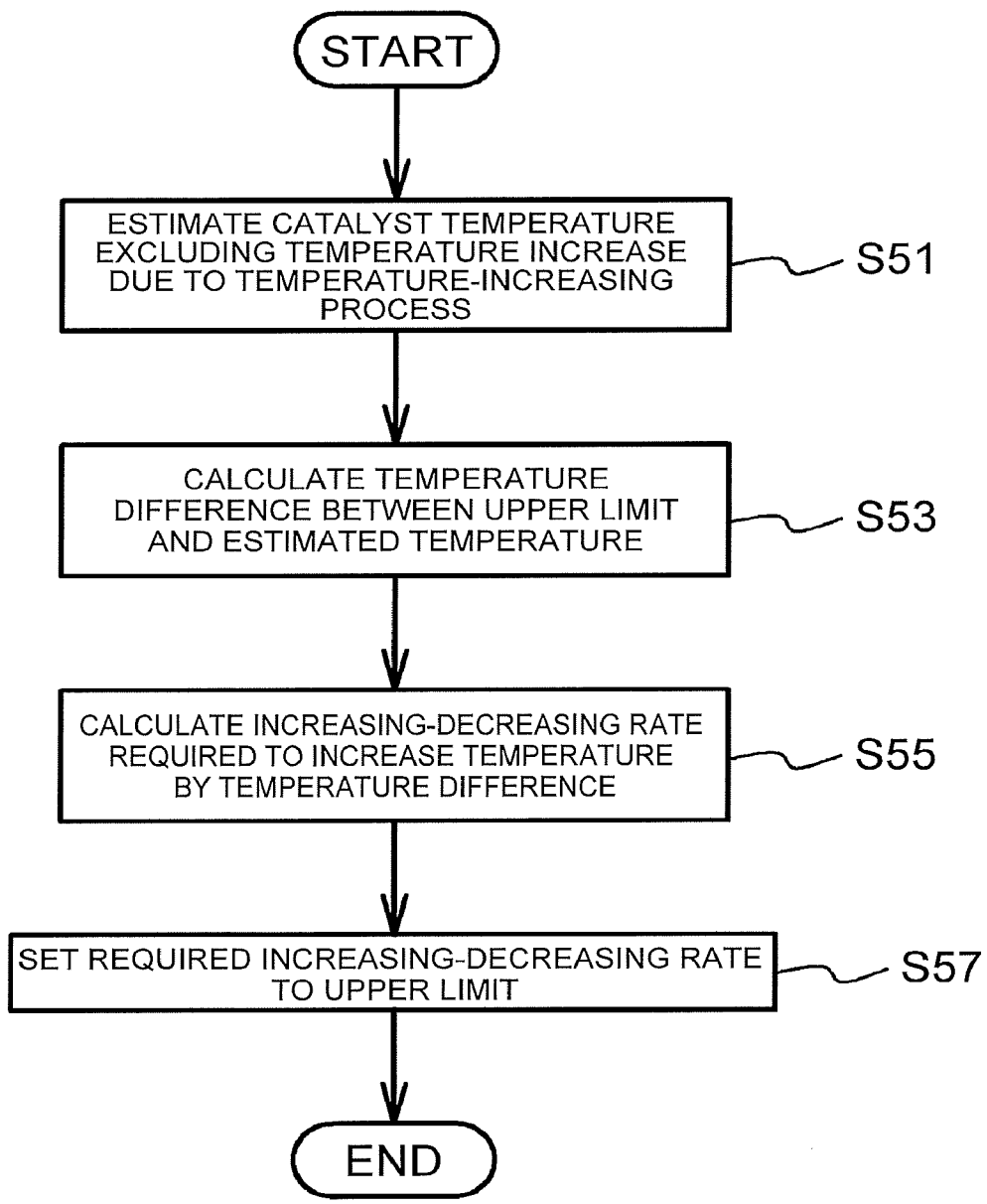

CONTROL APPARATUS FOR INTERNAL COMBUSTION ENGINE

INCORPORATION BY REFERENCE

The disclosure of Japanese Patent Application No. 2016-252595 filed on Dec. 27, 2016 including the specification, drawings and abstract is incorporated herein by reference in its entirety.

BACKGROUND

1. Technical Field

The disclosure relates to a control apparatus for an internal combustion engine.

2. Description of Related Art

For example, Japanese Unexamined Patent Application Publication No. 2012-057492 (JP 2012-057492 A) describes a temperature-increasing process of increasing the temperature of a catalyst by adjusting an air-fuel ratio in one cylinder of a plurality of cylinders of an internal combustion engine to a rich air-fuel ratio and adjusting an air-fuel ratio in the remaining cylinders to a lean air-fuel ratio. The temperature of the catalyst is increased to perform, for example, warm-up or regeneration of the catalyst.

SUMMARY

During execution of a temperature-increasing process, the temperature of a catalyst may excessively increase beyond the upper limit temperature thereof. If the temperature-increasing process is stopped to avoid such an excessive temperature increase, the temperature of the catalyst may drop, so that the effect of the temperature increase cannot be obtained.

The disclosure provides a control apparatus for an internal combustion engine, the control apparatus configured to increase the temperature of a catalyst while avoiding an excessive temperature increase.

An aspect of the disclosure relates to a control apparatus for an internal combustion engine. The control apparatus includes an electronic control unit. The electronic control unit is configured to i) determine whether a temperature-increasing process is being executed. The temperature-increasing process is a process of increasing a temperature of a catalyst configured to clean exhaust gas discharged from a plurality of cylinders of the internal combustion engine, by adjusting an air-fuel ratio in at least one cylinder of the plurality of cylinders to a rich air-fuel ratio that is lower than a stoichiometric air-fuel ratio, and adjusting an air-fuel ratio in the rest of the plurality of cylinders to a lean air-fuel ratio that is higher than the stoichiometric air-fuel ratio. The electronic control unit is configured to execute the following processes ii) to vi), when the electronic control unit determines that the temperature-increasing process is being executed. The electronic control unit is configured to: ii) calculate a target value of a parameter correlated with an amount of a difference between the rich air-fuel ratio and the lean air-fuel ratio that are achieved in the temperature-increasing process, based on an operating state of the internal combustion engine; iii) calculate, as an upper limit, a value of the parameter required to increase the temperature of the catalyst to an upper limit temperature set in advance; iv) determine whether the target value is equal to or lower than the upper limit; v) adjust the parameter used in the temperature-increasing process to the target value when the electronic control unit determines that the target value is equal to or lower than the upper limit; and vi) adjust the parameter used in the temperature-increasing process to the upper limit when the electronic control unit determines that the target value is higher than the upper limit.

When the target value is higher than the upper limit that is a value of the parameter required to increase the temperature of the catalyst to the upper limit temperature, the parameter used in the temperature-increasing process is adjusted to the upper limit instead of being adjusted to the target value. Thus, the temperature of the catalyst is suppressed from excessively increasing beyond the upper limit temperature.

In the control apparatus according to the above aspect, the electronic control unit may be configured to: estimate the temperature of the catalyst excluding an increase in the temperature of the catalyst caused by the temperature-increasing process, based on the operating state of the internal combustion engine during execution of the temperature-increasing process; calculate a temperature difference between the upper limit temperature and the estimated temperature of the catalyst; and calculate, as the upper limit, a value of the parameter required to increase the temperature of the catalyst by the temperature difference.

In the control apparatus according to the above aspect, the catalyst may include an upstream catalyst and a downstream catalyst provided downstream of the upstream catalyst in a flow direction of the exhaust gas from the internal combustion engine, and the electronic control unit may be configured to calculate, as the upper limit, a value of the parameter required to increase the temperature of the upstream catalyst to the upper limit temperature through execution of the temperature-increasing process.

The disclosure provides the control apparatus for an internal combustion engine, configured to increase the temperature of the catalyst while avoiding an excessive temperature increase.

BRIEF DESCRIPTION OF THE DRAWINGS

Features, advantages, and technical and industrial significance of exemplary embodiments will be described below with reference to the accompanying drawings, in which like numerals denote like elements, and wherein:

FIG. 3 is a flowchart illustrating an example of temperature-increasing control executed by an electronic control unit (ECU);

FIG. 4 is a flowchart illustrating an example of a process of calculating an upper limit;

DETAILED DESCRIPTION OF EMBODIMENTS

Figure 1:
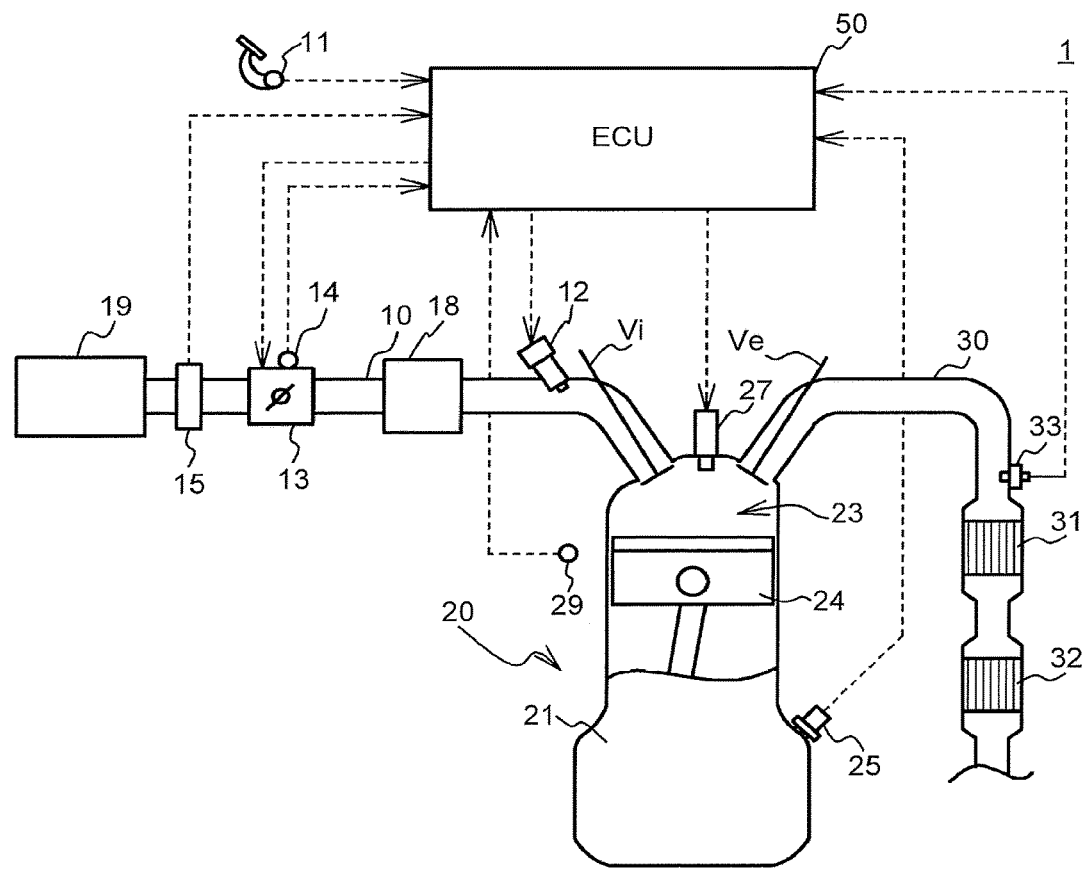
FIG. 1 is a schematic configuration diagram of an engine system.

FIG. 1 is a schematic configuration diagram of an engine system 1. As illustrated in FIG. 1, the engine system 1 includes an upstream catalyst 31 and a downstream catalyst 32 that are configured to clean exhaust gas discharged from an engine 20. The engine 20 is configured such that an air-fuel mixture is burned in combustion chambers 23 in a cylinder block 21 to cause pistons 24 to make a reciprocating motion. In the present embodiment, the engine 20 is an in-line four-cylinder engine. However, the engine 20 is not limited to an in-line four-cylinder engine, as long as the engine 20 includes a plurality of cylinders.

Each cylinder is provided with an intake valve Vi and an exhaust valve Ve that are disposed in a cylinder head of the engine 20. The intake valve Vi is configured to open and close an intake port, and the exhaust valve Ve is configured to open and close an exhaust port. Further, each cylinder is provided with an ignition plug 27 configured to ignite the air-fuel mixture in the combustion chamber 23. The ignition plugs 27 are attached to a top portion of the cylinder head.

The intake ports of the cylinders are connected to a surge tank 18 via branch pipes for the cylinders. An intake pipe 10 is connected to an upstream-side portion of the surge tank 18, and an air cleaner 19 is disposed at an upstream end of the intake pipe 10. Further, an air flow meter 15 configured to detect an intake air amount, and an electronically-controlled throttle valve 13 are disposed on the intake pipe 10 in this order from the upstream side.

The intake port of each cylinder is provided with a fuel injection valve 12 configured to inject fuel into the intake port. The fuel injected from the fuel injection valve 12 is mixed with the intake air to form an air-fuel mixture. The air-fuel mixture is taken into each combustion chamber 23 while the intake valve Vi is open, is then compressed by the piston 24, and is then ignited by the ignition plug 27 to be burned. In place of the fuel injection valve 12 configured to inject the fuel into the intake port, a fuel injection valve configured to inject the fuel directly into the cylinder may be provided. Alternatively, both a fuel injection valve configured to inject the fuel into the intake port and a fuel injection valve configured to inject the fuel directly into the cylinder may be provided.

The exhaust ports of the cylinders are connected to an exhaust pipe 30 via branch pipes for the cylinders. The exhaust pipe 30 is provided with the upstream catalyst 31, and the downstream catalyst 32 that is disposed downstream of the upstream catalyst 31. Each of the upstream catalyst 31 and the downstream catalyst 32 is a three-way catalyst in which a precious metal having a catalytic action (e.g., platinum (Pt)) and a material having an oxygen storage ability (e.g., ceria ($CeO_2$)) are supported on a support made of ceramic. Each of the upstream catalyst 31 and the downstream catalyst 32 is an example of a catalyst configured to clean exhaust gas discharged from the cylinders of the engine 20. Each of the upstream catalyst 31 and the downstream catalyst 32 may be an oxidation catalyst or a particulate filter coated with an oxidation catalyst.

An air-fuel ratio sensor 33 configured to detect an air-fuel ratio of the exhaust gas is disposed upstream of the upstream catalyst 31. The air-fuel ratio sensor 33 is a so-called wide-range air-fuel ratio sensor. The air-fuel ratio sensor 33 can continuously detect air-fuel ratios within a relatively wide range. The air-fuel ratio sensor 33 is configured to output a signal indicating a value proportional to the detected air-fuel ratio.

The engine system 1 includes an electronic control unit (ECU) 50. The ECU 50 includes a central processing unit (CPU), a random-access memory (RAM), a read-only memory (ROM), a storage device and so forth. The ECU 50 controls the engine 20 by executing programs stored in the ROM and the storage device. The ECU 50 is an example of a control apparatus for the engine 20. The ECU 50 executes temperature-increasing control described below.

The ignition plugs 27, the throttle valve 13, the fuel injection valves 12 and so forth are electrically connected to the ECU 50. Further, an accelerator operation amount sensor 11 configured to detect an accelerator operation amount, a throttle opening amount sensor 14 configured to detect an opening amount of the throttle valve 13, the air flow meter 15 configured to detect an intake air amount, the air-fuel ratio sensor 33, a crank angle sensor 25 configured to detect a crank angle of a crankshaft of the engine 20, a coolant temperature sensor 29 configured to detect a temperature of a coolant for the engine 20, and various other sensors are electrically connected to the ECU 50 via analog-to-digital converters and so forth (not illustrated). The ECU 50 controls the ignition plugs 27, the throttle valve 13, the fuel injection valves 12 and so forth to control the ignition timings, the fuel injection amounts, the fuel injection timings, the throttle opening amount and so forth, based on, for example, detection values obtained by the various sensors, such that desired engine power is produced.

Next, a method in which the ECU 50 sets a target air-fuel ratio will be described. The target air-fuel ratio is set based on an operating state of the engine 20 when a temperature-increasing process (described later) has been stopped. For example, when an operating state of the engine 20 is in a low-speed-rotation-and-low-load region, the target air-fuel ratio is set to the stoichiometric air-fuel ratio. On the other hand, when an operating state of the engine 20 is in a high-speed-rotation-and-high-load region, the target air-fuel ratio is set to an air-fuel ratio that is richer (lower) than the stoichiometric air-fuel ratio. After the target air-fuel ratio is set, the fuel injection amount for each cylinder is subjected to feedback control such that the air-fuel ratio detected by the air-fuel ratio sensor 33 coincides with the target air-fuel ratio.

The ECU 50 executes the temperature-increasing process of increasing the temperature of each of the upstream catalyst 31 and the downstream catalyst 32 to a value within a prescribed temperature range. In the temperature-increasing process, so-called dither control is executed. In the dither control, an air-fuel ratio in one cylinder of a plurality of cylinders is controlled to be adjusted to (hereinafter, "controlled to be adjusted to" will be simply referred to as "adjusted to") a rich air-fuel ratio that is lower than the stoichiometric air-fuel ratio, and an air-fuel ratio in each of the remaining three cylinders is adjusted to a lean air-fuel ratio that is higher than the stoichiometric air-fuel ratio. Specifically, in the control of the air-fuel ratios in the temperature-increasing process, the air-fuel ratio in one cylinder is adjusted to a rich air-fuel ratio by correcting the fuel injection amount such that the fuel injection amount is increased by a prescribed rate (percentage) with respect to the fuel injection amount corresponding to the target air-fuel ratio, whereas the air-fuel ratio in each of the remaining cylinders is adjusted to a lean air-fuel ratio by correcting the fuel injection amount such that the fuel injection amount is decreased by a prescribed rate (percentage) with respect to the fuel injection amount corresponding to the target air-fuel ratio. As in the present embodiment, when a rich air-fuel ratio is achieved in one cylinder, a lean air-fuel ratio is achieved in each of the remaining cylinders, and the average of the air-fuel ratios in all the cylinders is adjusted to the stoichiometric air-fuel ratio in the engine 20 including four cylinders, the increasing rate is three times higher than the decreasing rate. For example, when the increasing rate by which the fuel injection amount for one cylinder is increased with respect to the fuel injection amount corresponding to the target air-fuel ratio is 15%, the decreasing rate by which the fuel injection amount for each of the remaining cylinders is decreased with respect to the fuel injection amount corresponding to the target air-fuel ratio is 5%. When the temperature-increasing process is executed as described above, excess fuel discharged from the cylinder, in which the air-fuel ratio has been set to a rich air-fuel ratio, adheres to the upstream catalyst 31 and the downstream catalyst 32, and is burned under a lean atmosphere created by the exhaust gas discharged from the cylinders, in which the air-fuel ratio has been set to a lean air-fuel ratio. In this way, the temperature of each of upstream catalyst 31 and the downstream catalyst 32 is increased.

An increasing-decreasing rate is a total value of the increasing rate by which the fuel injection amount is increased with respect to the fuel injection amount corresponding to the target air-fuel ratio and the decreasing rate by which the fuel injection amount is decreased with respect to the fuel injection amount corresponding to the target air-fuel ratio. The ECU 50 achieves the air-fuel ratios in the temperature-increasing process by adjusting the increasing-decreasing rate to a target value. For example, when the target value is 20%, a rich air-fuel ratio is achieved by increasing the fuel injection amount by 15% as described above, and a lean air-fuel ratio is achieved by decreasing the fuel injection amount by 5% as described above. The target value used in the temperature-increasing process is defined in a map that is defined in advance based on the operating state of the engine 20.

Figure 2:
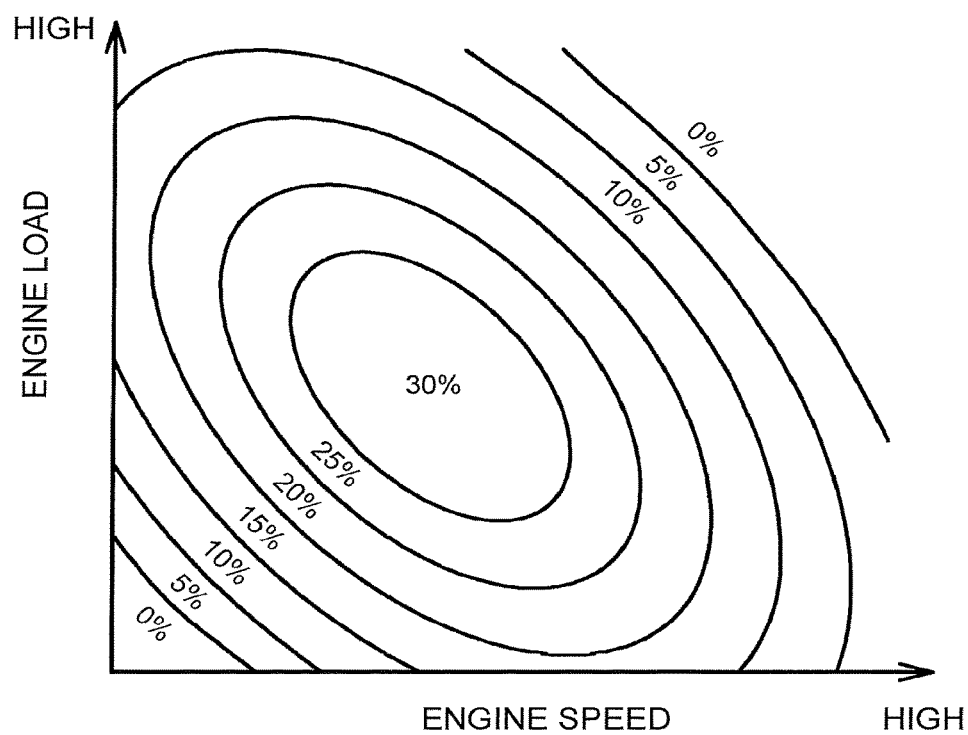
FIG. 2 is a map illustrating a target value in a temperature-increasing process, which is defined based on an operating state of an engine.

FIG. 2 is a map illustrating a target value in the temperature-increasing process, which is defined based on an operating state of the engine 20. The map is stored in advance in the memory of the ECU 50. As the increasing-decreasing rate is higher, in other words, as the difference between a rich air-fuel ratio and a lean air-fuel ratio that are achieved in the temperature-increasing process is larger, the amount of unburned fuel in the exhaust gas discharged from the cylinder, in which the air-fuel ratio has been adjusted to the rich air-fuel ratio, is larger, whereby an increase temperature of each of the upstream catalyst 31 and the downstream catalyst 32 due to the temperature-increasing process is higher. Further, as the engine load of the engine 20 is lower and as the engine speed of the engine 20 is lower, the temperature of the exhaust gas is lower. Thus, in order to sufficiently increase the temperature of each of the upstream catalyst 31 and the downstream catalyst 32, it is desirable to adjust the increasing-decreasing rate to a higher value as the engine load of the engine 20 is lower and as the engine speed of the engine 20 is lower. However, if the increasing-decreasing rate is high when the engine load of the engine 20 or the engine speed of the engine 20 is low, the difference among the outputs from the cylinders increases, whereby the fluctuation in the engine speed of the engine 20 increases. As a result, degradation of the drivability may be caused, or a misfire may be erroneously detected despite the absence of a misfire. In view of this, in the map in FIG. 2, in consideration of achievement of the effect of an increase in the temperature of each of the upstream catalyst 31 and the downstream catalyst 32, prevention of degradation of the drivability, and prevention of erroneous detection of a misfire, the target value is set to a low value when the engine load is a low load and the engine speed is a low speed, the target value is set to a high value when the engine load is a medium load and the engine speed is a medium speed, and the target value is set to a low value when the engine load is a high load and the engine speed is a high speed.

As in the present embodiment, when the engine 20 including four cylinders is employed, the air-fuel ratio in only one cylinder is adjusted to a rich air-fuel ratio, and the average of the air-fuel ratios in all the cylinders is adjusted to the stoichiometric air-fuel ratio, a rich air-fuel ratio is achieved by correcting the fuel injection amount such that the fuel injection amount is increased by a rate corresponding to three-fourths (¾) of the target value, and a lean air-fuel ratio is achieved by correcting the fuel injection amount such that the fuel injection amount is decreased by a rate corresponding to one-fourth (¼) of the target value. For example, when the engine 20 including four cylinders is employed and the air-fuel ratio in each of two cylinders is adjusted to a rich air-fuel ratio, a rich air-fuel ratio is achieved by correcting the fuel injection amount such that the fuel injection amount is increased by a rate corresponding to one-half (½) of the target value, and a lean air-fuel ratio is achieved by correcting the fuel injection amount such that the fuel injection amount is decreased by a rate corresponding to one-half (½) of the target value.

As described above, an increasing-decreasing rate, which is a total value of an increasing rate and a decreasing rate, is correlated with the amount of a difference between a rich air-fuel ratio and a lean air-fuel ratio. This is because, the air-fuel ratio is richer (lower) as the increasing rate is higher, the air-fuel ratio is leaner (higher) as the decreasing rate is higher, and the difference between the rich air-fuel ratio and the lean air-fuel ratio increases as the increasing-decreasing rate is higher. Therefore, the increasing-decreasing rate is an example of a parameter correlated with the amount of the difference between the rich air-fuel ratio and the lean air-fuel ratio that are achieved in the temperature-increasing process. Further, the target value described above is an example of a target value of the parameter correlated with the amount of the difference between the rich air-fuel ratio and the lean air-fuel ratio that are achieved in the temperature-increasing process. Note that, in the present embodiment, a rich air-fuel ratio and a lean air-fuel ratio are achieved respectively through increasing-correction and decreasing-correction executed on the fuel injection amount at which the target air-fuel ratio is achieved. However, the method of achieving a rich air-fuel ratio and a lean air-fuel ratio is not limited to this. That is, in the temperature-increasing process, the target air-fuel ratio for one of the cylinders may be set directly to a rich air-fuel ratio and the target air-fuel ratio for the remaining cylinders may be set directly to a lean air-fuel ratio, so that a rich air-fuel ratio and a lean air-fuel ratio are achieved. In this case, the amount of the difference between the rich air-fuel ratio and the lean air-fuel ratio, which are set as the target air-fuel ratios, corresponds to the parameter described above.

In the temperature-increasing process, the average of the air-fuel ratios in all the cylinders is set to the stoichiometric air-fuel ratio. However, the average of the air-fuel ratios in all the cylinders need not be the stoichiometric air-fuel ratio, as long as the average of the air-fuel ratios in all the cylinders is set a value within a prescribed range including the stoichiometric air-fuel ratio such that the temperature of each of the upstream catalyst 31 and the downstream catalyst 32 can be increased. For example, a rich air-fuel ratio may be set to an air-fuel ratio within a range from 9 to 12, and a lean air-fuel ratio may be set to an air-fuel ratio within a range from 15 to 16. The air-fuel ratio in at least one of the cylinders needs to be set to a rich air-fuel ratio, and the air-fuel ratio in each of the remaining cylinders needs to be set to a lean air-fuel ratio.

As described above, the upstream catalyst 31 is disposed upstream of the downstream catalyst 32. Thus, the upstream catalyst 31 is exposed to the high-temperature exhaust gas that has just been discharged from the engine 20, so that the temperature of the upstream catalyst 31 is likely to be higher than that of the downstream catalyst 32. Thus, due to execution of the temperature-increasing process, the temperature of the upstream catalyst 31 may increase excessively beyond the upper limit temperature thereof. In order to avoid such an excessive temperature increase, when the temperature of the upstream catalyst 31 exceeds the upper limit temperature during execution of the temperature-increasing process, the temperature-increasing process may be stopped. However, if the temperature-increasing process is stopped, the temperature of each of both the upstream catalyst 31 and the downstream catalyst 32 drops, so that the temperature-increasing process may be stopped before the effect of execution of the temperature-increasing process is obtained. In view of this, the ECU 50 executes the temperature-increasing control for increasing the temperature of each of the upstream catalyst 31 and the downstream catalyst 32 while avoiding an excessive increase in the temperature of the upstream catalyst 31.

FIG. 3 is a flowchart illustrating an example of the temperature-increasing control executed by the ECU 50. The process illustrated in the flowchart in FIG. 3 is repeatedly executed at prescribed time intervals. First, the ECU 50 determines whether the temperature-increasing process is being executed (step S1). When the ECU 50 makes a negative determination in step S1, the control ends. The temperature-increasing process is a process of increasing the temperature of the upstream catalyst 31 configured to clean the exhaust discharged from the cylinders, by adjusting the air-fuel ratio in at least one cylinder of the cylinders of the engine 20 to a rich air-fuel ratio that is lower than the stoichiometric air-fuel ratio and adjusting the air-fuel ratio of each of the cylinders other than the at least one cylinder to a lean air-fuel ratio that is higher than the stoichiometric air-fuel ratio.

On the other hand, when the ECU 50 makes an affirmative determination in step S1, the ECU 50 calculates a target value used in the temperature-increasing process with reference to the map illustrated in FIG. 2 (step S3). More specifically, when the ECU 50 makes an affirmative determination in step S1, the ECU 50 calculates a target value of a parameter correlated with the amount of the difference between the rich air-fuel ratio and the lean air-fuel ratio that are achieved in the temperature-increasing process, based on the operating state of the engine 20.

Next, the ECU 50 calculates an upper limit of the target value used in the temperature-increasing process (step S5). The upper limit is a value that is set in order to prevent the temperature of the upstream catalyst 31 from exceeding the upper limit temperature thereof due to execution of the temperature-increasing process. When the ECU 50 makes an affirmative determination in step S1, the ECU 50 calculates, as the upper limit, a value of the parameter required to increase the temperature of the upstream catalyst 31 to the upper limit temperature. The details of the process in step S5 will be described later.

Next, the ECU 50 determines whether the target value is equal to or lower than the upper limit (step S7). When the ECU 50 makes an affirmative determination in step S7, the ECU 50 adjusts the increasing-decreasing rate used in the temperature-increasing process to the target value (step S9). On the other hand, when the ECU 50 makes a negative determination in step S7, the ECU 50 adjusts the increasing-decreasing rate used in the temperature-increasing process to the upper limit (step S11). As described above, during execution of the temperature-increasing process, the ECU 50 repeatedly executes calculation of a target value and an upper limit and comparison between the target value and the upper limit, and adjusts the increasing-decreasing rate to the target value or the upper limit. In other words, when the ECU 50 makes an affirmative determination in step S7, the ECU 50 adjusts the parameter used in the temperature-increasing process to the target value, whereas when the ECU 50 makes a negative determination in step S7, the ECU 50 adjusts the parameter used in the temperature-increasing process to the upper limit.

Figure 5A:
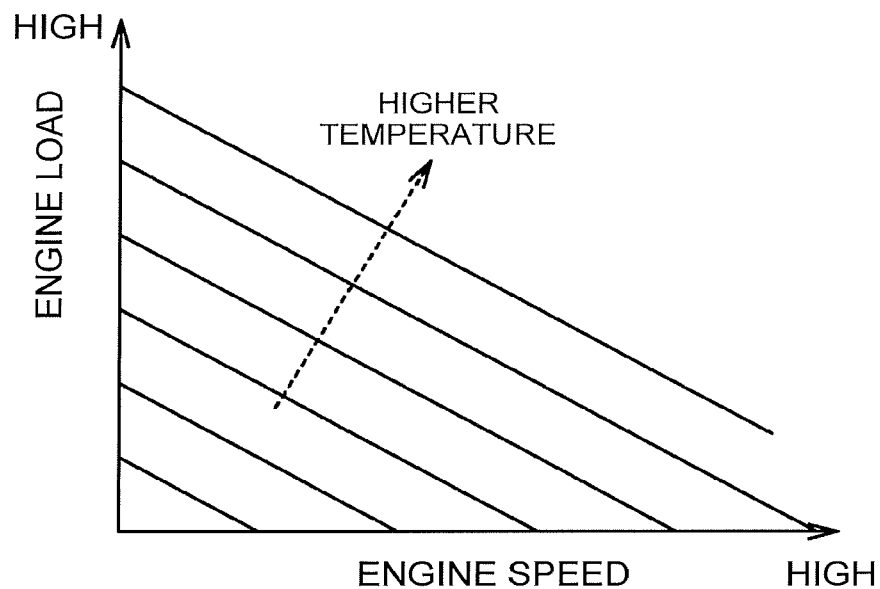
FIG. 5A is an example of a map that defines a temperature of an upstream catalyst corresponding to an engine speed and an engine load in a normal operating state where the temperature-increasing process has been stopped.

Next, a process of calculating the upper limit, which is executed by the ECU 50, will be described. FIG. 4 is a flowchart illustrating an example of the process of calculating the upper limit. During execution of the temperature-increasing process, the ECU 50 estimates a temperature of the upstream catalyst 31, excluding an increase in the temperature of the upstream catalyst 31 caused by the temperature-increasing process (step S51). The estimated temperature of the upstream catalyst 31 is obtained during execution of the temperature-increasing process, and corresponds to the temperature of the upstream catalyst 31 in a normal operating state where the temperature-increasing process has been stopped. FIG. 5A is an example of a map that defines a temperature of the upstream catalyst 31 corresponding to an engine speed and an engine load of the engine 20 in the normal operating state where the temperature-increasing process has been stopped. The map is obtained in advance through experiments and stored in the memory of the ECU 50. Each line segment in FIG. 5B indicates a line segment on which an increase temperature is constant when the increasing-decreasing rate is 100%. The temperature of the upstream catalyst 31 is estimated to be higher as the engine speed of the engine 20 is higher and as the engine load of the engine 20 is higher. The ECU 50 may estimate a temperature of the upstream catalyst 31, excluding an increase in the temperature of the upstream catalyst 31 caused by the temperature-increasing process, in consideration of, in addition to the map in FIG. 5A, an ignition retarded amount, an exhaust gas recirculation (EGR) rate, a valve duration (i.e., a length of time, in degrees, that a valve is held open) of each of the intake valve Vi and the exhaust valve Ve, which is achieved by a variable valve timing mechanism, a scavenging rate, and so forth. In step S51, the ECU 50 estimates a temperature of the upstream catalyst 31, excluding an increase in the temperature of the upstream catalyst 31 caused by the temperature-increasing process, based on the operating state of the engine 20 during execution of the temperature-increasing process.

Next, the ECU 50 calculates a temperature difference between the upper limit temperature of the upstream catalyst 31 and the estimated temperature of the upstream catalyst 31 obtained in step S51 (step S53). The temperature difference is a value obtained by subtracting the estimated temperature obtained in step S51, from the upper limit temperature of the upstream catalyst 31. Note that, the upper limit temperature of the upstream catalyst 31 is set in advance to a temperature lower, by a prescribed temperature, than the temperature at which the upstream catalyst 31 actually starts to melt. The upper limit temperature is stored in the memory of the ECU 50.

Figure 5B:
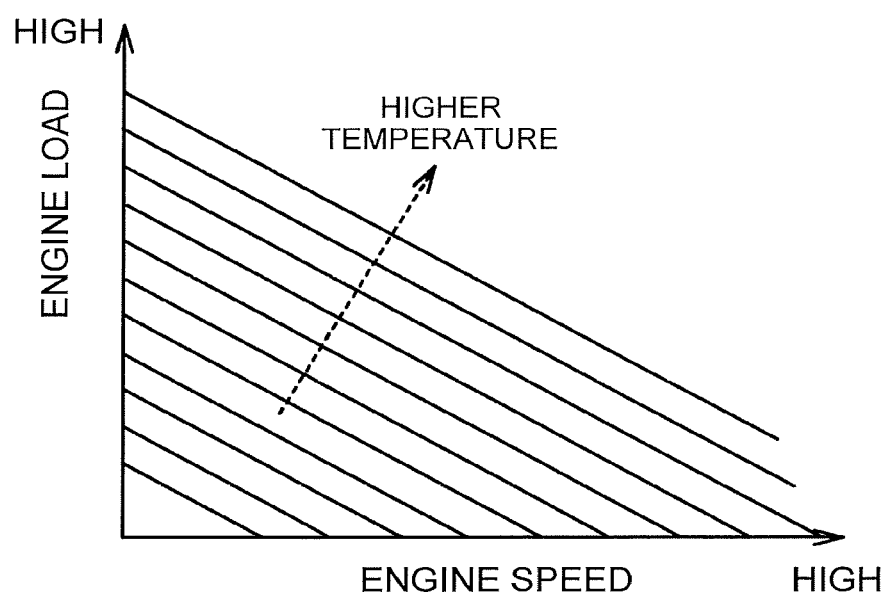
FIG. 5B is an example of a map that defines an increase temperature of the upstream catalyst corresponding to an engine speed and an engine load when an increasing-decreasing rate is 100%.

Next, the ECU 50 calculates an increasing-decreasing rate that is required to increase the temperature of the upstream catalyst 31 by the calculated temperature difference (step S55). Specifically, the ECU 50 calculates the increasing-decreasing rate as described below. First, the ECU 50 calculates an increase temperature of the upstream catalyst 31 on the assumption that the increasing-decreasing rate is adjusted to 100%. FIG. 5B is an example of a map that defines an increase temperature of the upstream catalyst 31 corresponding to an engine speed and an engine load of the engine 20 when the increasing-decreasing rate is 100%. The map is obtained in advance through experiments and stored in the memory of the ECU 50. Each line segment in FIG. 5B indicates a line segment on which an increase temperature is constant when the increasing-decreasing rate is 100%. The increase temperature of the upstream catalyst 31 is estimated to be higher as the engine speed of the engine 20 is higher and as the engine load of the engine 20 is higher. This is because, as the engine speed of the engine 20 is higher and as the engine load of the engine 20 is higher, the fuel injection amount serving as the basis of the increasing-decreasing rate also increases.

Here, an increase temperature when the increasing-decreasing rate is 100% is denoted by $\Delta T_{100}$ [° C.]. The temperature difference calculated in step S53 is denoted by $\Delta T_x$ [° C.]. Where a required increasing-decreasing rate that is required to increase the temperature of the upstream catalyst 31 by the temperature difference $\Delta T_x$ is denoted by X [%], the required increasing-decreasing rate X is calculated according to the following expression.

$$X[\%]=(\Delta T_x[° \text{C.}]/\Delta T_{100}[° \text{C.}])\times 100[\%]$$

In this way, the ECU 50 calculates the required increasing-decreasing rate X by multiplying the value, which is obtained by dividing the temperature difference $\Delta T_x$ by the increase temperature $\Delta T_{100}$, by 100. Next, the ECU 50 sets the calculated required increasing-decreasing rate X as the upper limit (step S57). As described above, the ECU 50 repeatedly calculates an upper limit during execution of the temperature-increasing process, based on the temperature difference $\Delta T_x$ and the increase temperature $\Delta T_{100}$ each of which varies depending on the operating state of the engine 20. The target value is also calculated as a value that varies depending on a change in the operating state of the engine 20 as described above. Therefore, each of the target value and the upper limit is calculated as a value that varies depending on a change in the operating state of the engine 20 during execution of the temperature-increasing process. The process in step S55 and step S57 is an example of a process of calculating, as the upper limit, a value of the parameter that is required to increase the temperature of the upstream catalyst 31 by the temperature difference.

Note that the ECU 50 may calculate the required increasing-decreasing rate X directly from a map or a calculation formula based on the engine speed and the engine load of the engine 20. However, such a map and a calculation formula may be complicated. In particular, a map and a calculation formula may be further complicated if an ignition retarded amount and so forth are taken into consideration in addition to the engine speed and the engine load of the engine 20 in order to calculate the required increasing-decreasing rate X accurately. However, in a case where the ECU 50 calculates the required increasing-decreasing rate X based on the temperature difference $\Delta T_x$ and the increase temperature $\Delta T_{100}$, the ECU 50 may estimate, in step S51, a temperature of the upstream catalyst 31, excluding an increase in the temperature of the upstream catalyst 31 caused by the temperature-increasing process, in consideration of the ignition retarded amount and so forth, in addition to the engine speed and the engine load of the engine 20, as described above. In this case, the ECU 50 can easily calculate the temperature difference $\Delta T_x$, and can easily calculate the increase temperature $\Delta T_{100}$ based on the engine speed and the engine load of the engine 20. As a result, the ECU 50 can easily calculate the required increasing-decreasing rate X based on the temperature difference $\Delta Tx$ and the increase temperature $\Delta T_{100}$ as described above.

Figure 6:
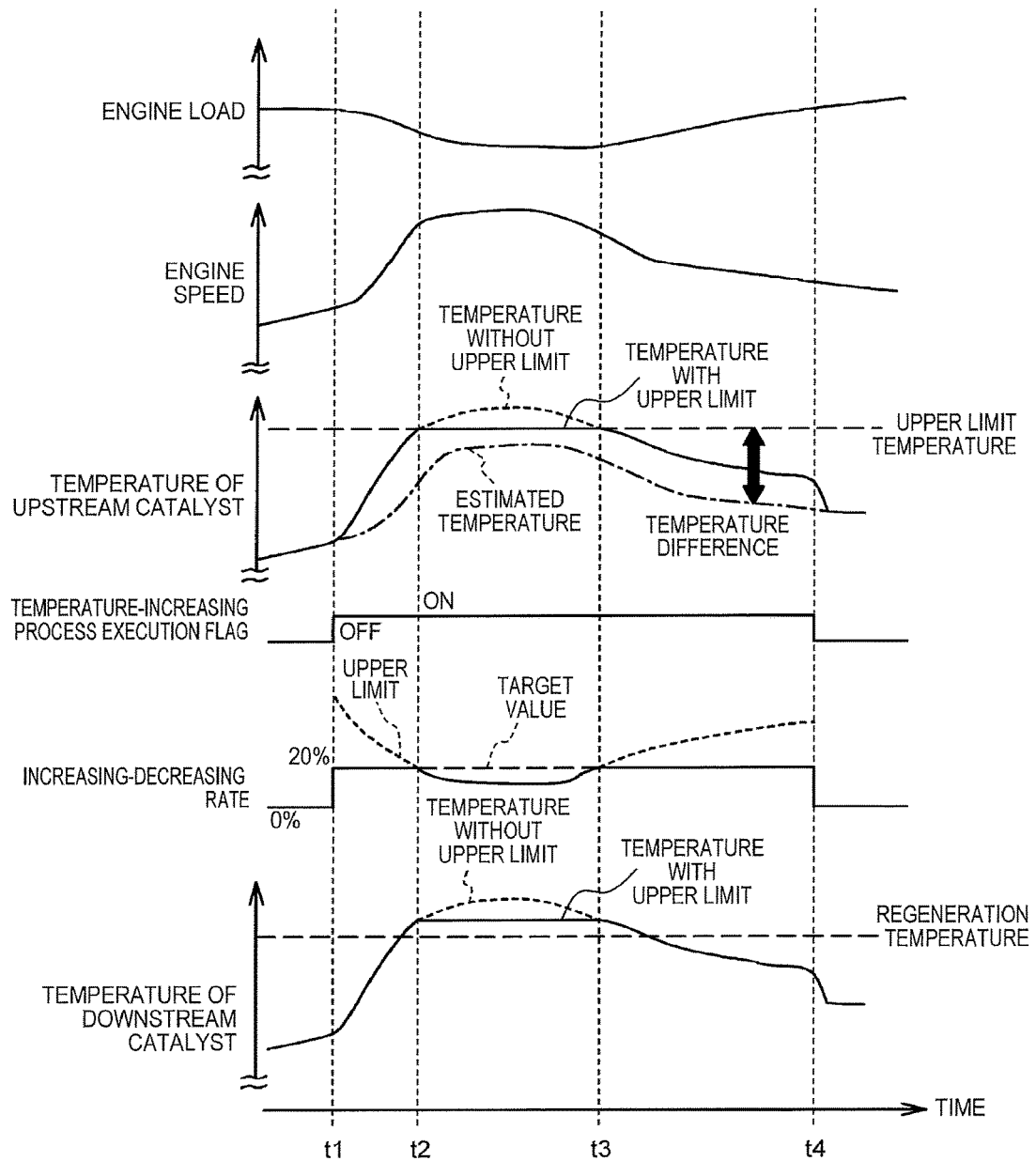
FIG. 6 is an example of a time-series chart when the temperature-increasing process is executed.

Next, a case where the temperature-increasing process according to the present embodiment is executed will be described with reference to a time-series chart. FIG. 6 is an example of a time-series chart when the temperature-increasing process is executed. FIG. 6 illustrates the engine load of the engine 20, the engine speed of the engine 20, the temperature of the upstream catalyst 31, the execution flag for the temperature-increasing process, the increasing-decreasing rate in the temperature-increasing process, and the temperature of the downstream catalyst 32. To facilitate understanding, the example in FIG. 6 indicates a case where a target value of the increasing-decreasing rate in the temperature-increasing process, which is calculated based on the operating state of the engine 20, is constantly maintained at 20%. In FIG. 6, the actually controlled increasing-decreasing rate is indicated by a continuous line, and the upper limit and the target value are respectively indicated by a dotted line and a dashed line. The estimated temperature of the upstream catalyst 31, which is calculated in step S51, is indicated by a long dashed short dashed line.

When the execution flag for the temperature-increasing process is switched from OFF to ON at time t1 in response to, for example, a request to regenerate the downstream catalyst 32, a target value and an upper limit are calculated. Immediately after time t1, the target value is equal to or lower than the upper limit. Therefore, the increasing-decreasing rate in the temperature-increasing process is switched from 0% to 20% that is the target value, without being limited by the upper limit. Thus, the temperature of each of the upstream catalyst 31 and the downstream catalyst 32 increases. Note that, in FIG. 6, the increasing-decreasing rate is maintained at the target value from time t1 to time t2, and therefore the continuous line indicating the actual increasing-decreasing rate and the dashed line indicating the target value coincide with each other.

When the temperature of the upstream catalyst 31 approaches the upper limit temperature due to changes in the engine load and the engine speed of the engine 20 and execution of the temperature-increasing process, the calculated upper limit approaches the target value. When the upper limit becomes lower than the target value at time t2, the increasing-decreasing rate is switched from the target value to the upper limit. If the increasing-decreasing rate is not limited by the upper limit, the temperature of the upstream catalyst 31 exceeds the upper limit temperature at time t2, as illustrated in FIG. 6. However, in the present embodiment, the temperature of the upstream catalyst 31 is suppressed from exceeding the upper limit temperature because the increasing-decreasing rate is limited by the upper limit. During a period from time t2 to time t3 during which the upper limit is lower than the target value, the temperature-increasing process is continued while the increasing-decreasing rate is adjusted to the upper limit. Thus, the temperature of the upstream catalyst 31 is maintained at a temperature close to the upper limit temperature. During the period from time t2 to time t3, the temperature of the downstream catalyst 32 is maintained at a temperature that is equal to or higher than the temperature required for regeneration When the upper limit becomes equal to or higher than the target value at time t3 due to changes in the engine load and the engine speed of the engine 20, the increasing-decreasing rate is switched from the upper limit to the target value, so that a temperature increase is achieved within such a range that the temperature of the upstream catalyst 31 does not exceed the upper limit temperature. When the execution flag for the temperature-increasing process is switched from ON to OFF at time t4, the temperature-increasing process is stopped, so that the air-fuel ratio in each cylinder is adjusted to a target air-fuel ratio that is set based on the operating state of the engine 20.

As described above, an excessive increase in the temperature of the upstream catalyst 31 is avoided and the temperature of the upstream catalyst 31 is maintained at a temperature close to the upper limit temperature. Thus, an effect of an increase in the temperature of the upstream catalyst 31 can be reliably obtained. Further, an effect of an increase in the temperature of the downstream catalyst 32 can be reliably obtained.

In the foregoing embodiment, an upper limit is calculated such that the temperature of the upstream catalyst 31 does not exceed its upper limit temperature. However, the method of calculating an upper limit is not limited to this. For example, in a case where the possibility that execution of the temperature-increasing process causes the temperature of the downstream catalyst 32 to exceed its upper limit temperature is higher than the possibility that execution of the temperature-increasing process causes the temperature of the upstream catalyst 31 to exceed its upper limit temperature, the upper limit may be calculated such that the temperature of downstream catalyst 32 does not exceed its upper limit temperature. Examples of such a case include a case where the upper limit temperature of the downstream catalyst 32 is relatively low, whereas the upper limit temperature of the upstream catalyst 31 is relatively high. In this case, like the processes in step S51 to step S57, a temperature of the downstream catalyst 32, excluding an increase in the temperature of the downstream catalyst 32 caused by the temperature-increasing process, is estimated, then a temperature difference between the upper limit temperature of the downstream catalyst 32 and the estimated temperature of the downstream catalyst 32 is calculated, and then an increasing-decreasing rate required to increase the temperature of the downstream catalyst 32 by the temperature difference is calculated as an upper limit.

In the foregoing embodiment, two catalysts, that is, the upstream catalyst 31 and the downstream catalyst 32, are provided. Alternatively, only one catalyst may be provided. In this case as well, an upper limit can be calculated through the processes similar to those in step S51 to step S57.

While example embodiments of the disclosure have been described in detail, the disclosure is not limited to the foregoing example embodiments, and various modification and changes may be made to the foregoing example embodiments within the technical scope of the disclosure defined by the appended claims.

What is claimed is:

1. A control apparatus for an internal combustion engine, the control apparatus comprising:
    an electronic control unit configured to i) determine whether a temperature-increasing process is being executed, the temperature-increasing process being a process of increasing a temperature of a catalyst configured to clean exhaust gas discharged from a plurality of cylinders of the internal combustion engine, by adjusting an air-fuel ratio in at least one cylinder of the plurality of cylinders to a rich air-fuel ratio that is lower than a stoichiometric air-fuel ratio, and adjusting an air-fuel ratio in the rest of the plurality of cylinders to a lean air-fuel ratio that is higher than the stoichiometric air-fuel ratio,
    when the electronic control unit determines that the temperature-increasing process is being executed, the electronic control unit is configured to:
    ii) calculate a target value of a parameter correlated with an amount of a difference between the rich air-fuel ratio and the lean air-fuel ratio that are achieved in the temperature-increasing process, based on an operating state of the internal combustion engine;
    iii) calculate, as an upper limit, a value of the parameter required to increase the temperature of the catalyst to an upper limit temperature set in advance;
    iv) determine whether the target value is equal to or lower than the upper limit;
    v) adjust the parameter used in the temperature-increasing process to the target value when the electronic control unit determines that the target value is equal to or lower than the upper limit; and
    vi) adjust the parameter used in the temperature-increasing process to the upper limit when the electronic control unit determines that the target value is higher than the upper limit.

2. The control apparatus according to claim 1, wherein the electronic control unit is configured to:
    estimate the temperature of the catalyst excluding an increase in the temperature of the catalyst caused by the temperature-increasing process, based on the operating state of the internal combustion engine during execution of the temperature-increasing process;
    calculate a temperature difference between the upper limit temperature and the estimated temperature of the catalyst; and
    calculate, as the upper limit, a value of the parameter required to increase the temperature of the catalyst by the temperature difference.

3. The control apparatus according to claim 1, wherein:
    the catalyst includes an upstream catalyst and a downstream catalyst provided downstream of the upstream catalyst in a flow direction of the exhaust gas from the internal combustion engine; and
    the electronic control unit is configured to calculate, as the upper limit, a value of the parameter required to increase the temperature of the upstream catalyst to the upper limit temperature through execution of the temperature-increasing process.

4. The control apparatus according to claim 1, wherein in the temperature increasing process, an average of the air-fuel ratio in all of the plurality of cylinders is set to the stoichiometric air-fuel ratio.

5. The control apparatus according to claim 3, wherein an average of the air-fuel ratios in all of the plurality of cylinders is set to a value within a prescribed range including the stoichiometric air-fuel ratio such that the temperature of the upstream catalyst and a temperature of the downstream catalyst can be increased.

6. The control apparatus according to claim 2, wherein, in addition to being estimated based on the operating state of the internal combustion engine, the temperature of the catalyst is estimated based on one or more of an ignition retarded amount, an exhaust gas recirculation rate, a valve duration of each of an intake valve and an exhaust valve which is achieved by a variable valve timing mechanism, and a scavenging rate.

* * * * *